United States Patent Office 3,502,595
Patented Mar. 24, 1970

3,502,595
PREPARATION OF SILICA-ALUMINA, TITANIA-ALUMINA, AND PHOSPHOROUS OXIDE-ALUMINA CATALYSTS
Marvin F. L. Johnson, Homewood, Norman J. Williams, Park Forest, and Robert A. Sanford, Homewood, Ill., assignors to Sinclair Research, Inc., New York, N.Y., a corporation of Delaware
No Drawing. Filed Oct. 28, 1965, Ser. No. 505,472
Int. Cl. B01j 11/40, 11/32; C10g 11/04
U.S. Cl. 252—437
11 Claims

ABSTRACT OF THE DISCLOSURE

A new process has been discovered for the preparation of highly acidic silica-alumina, titania-alumina and phosphorous oxide-alumina catalysts and supports. The process includes heating, preferably under reflux, and reaction in an inert organic solvent, of a solid, uncalcined, hydroxyl-containing alumina having at least about 15 to 40 percent vaporizable material and having a surface area of at least about 300 m.$^2$/gm. with one or more of the following esters:

$$R_{(4-x)}Si(OR')_x$$

$$Ti(OR)_4$$

and $$(RO)_3PO$$

wherein R and R' are the same or different hydrocarbon groups of up to 18 or more carbon atoms, advantageously of 1–8 carbon atoms, and $x$ is a number from 1 to 4, and removing the resulting solid, inorganic oxide-alumina composition from the solvent and alcohol derived from the reaction. The solid product can be calcined to a more active state.

---

The present invention is directed to a method of preparing acidic catalysts and supports. More specifically, it is directed to the preparation of catalysts comprised of alumina in chemical combination with oxides of silicon, boron, titanium or phosphorus.

Silica-alumina, boria-alumina, titania-alumina and phosphorus oxide-alumina compositions can be used as hydrocarbon cracking catalysts or as catalyst supports, for example in hydrogenation, denitrogenation or hydrocracking catalysts containing metals such as a hydrogenation component or dual function metal catalyst components. A source of the activity in these catalysts is known to reside at least in part in their acidity; for example, when employing a silica-alumina support platinum catalyst is hydrocracking, olefins are considered to be produced at platinum sites, cracked at acidic sites, and the products hydrogenated at the platinum sites. An increase of acidic sites on the catalyst surface, therefore, will yield a corresponding increase in cracking activity.

Conventionally, silica-alumina, titania-alumina, etc., are prepared by a coprecipitation process or by the addition of alumina or an aluminum salt to a hydrogel of the other inorganic oxide, e.g., in the case of silica-alumina, a silica hydrogen, followed by washing and drying. Major drawbacks in inorganic oxide-alumina composites prepared by these conventional processes are that they are limited insofar as the type of pore structure they are able to provide, in their ability to disperse promoters on the surfaces of the inorganic oxide-alumina support and in their ability to provide a high incidence of acidic sites.

A process has now been discovered which enables the preparation of highly acidic silica-alumina, boria-alumina, titania-alumina and phosphorus oxide-alumina compositions having a wider variety of pore structures than those from conventional preparations. Furthermore, the process of the invention offers the advantage of enabling greater dispersion of catalytic promoters when the inorganic oxide-alumina compositions are to be employed as catalyst supports.

In accordance with the present invention a solid hydroxyl-containing alumina is reacted with one or more of the following esters:

$$R_{(4-x)}Si(OR')_x$$

$$B(OR)_3$$

$$Ti(OR)_4$$

or $$(RO)_3PO$$

wherein R and R' are the same or different hydrocarbon groups of up to 18 or more carbon atoms, advantageously of 1–8 carbon atoms and preferably alkyl groups, and $x$ is a number from 1 to 4.

Illustrative of esters contemplated for use in the present invention are ethyl orthosilicate, ethyl triethoxysilane, diethyl diethoxysilane, triethyl ethoxysilane, triethyl borate, trimethyl borates, tetraisopropyl titanate, triethyl phosphate and the like.

The alumina with which the ester is reacted is a solid, adsorptive, hydroxyl-containing alumina due to being at least slightly in a state of hydration. The alumina can be, for instance, a hydrate alumina such as amorphous hydrous alumina, alumina monohydrate, alumina trihydrate or their mixture, or a calcined alumina such as an alumina of the gamma family. Often the calcined or "activated" aluminas will have a minimum loss on ignition of at least about 1 weight percent, i.e. the percent by weight of vaporizable material (percent V.M.) at 1000° C. The alumina is, however, preferably uncalcined and advantageously, in order to provide an optimum number of acidic sites, contains a high surface area such as a surface area of at least about 100 m.$^2$/gm., preferably greater than about 300 m.$^2$/gm., as determined by the BET adsorption technique, and should have at least 5% loss on ignition; preferably the percent V.M. will be from about 15 to 40%. The alumina can also contain small amounts of other solid oxides such as magnesia, natural or activated clays (such as kaolinite, montmorillonite, halloysite, etc.), zirconia, etc., or their mixtures.

The reaction of the alumina and the ester can advantageously be carried out by contacting a slurry of alumina in an inert organic solvent such as isooctane with the desired amount of ester and heating to reflux with stirring until the reaction is essentially complete. The amount of solvent employed provides fluidity to the reaction mixture. Similarly, the particular solvent used can vary widely providing it be essentially inert to the reactants employed. Suitable liquid solvents include hydrocarbons, oxygenated organic materials such as ethers, esters, ketones, e.g., methyl ethyl ketone, etc. The reaction is conveniently carried out at temperatures from about 25 to 270° C., preferably about 80 to 250° C. Pressures from about 1 atmosphere to 25 atmospheres or more may be employed. The reacted slurry can be heated to distill off most of the solvent, and distillation may be followed by cooling, solvent washing and drying. If a more active catalytic base is desired the dried product can then be calcined under conventional calcination conditions, e.g., at temperatures of about 800 to 1300° F. or more, preferably about 900 to 1050° F. Calcination is effective to convert the ester-alumina reaction product to its more active, chemically-combined inorganic oxide-alumina form.

In order to maximize the reaction of the ester with the

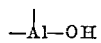

groups, the presence of free water in the reaction mixture is to be avoided. For instance, in the case of the silicates, the alkoxysilanes, for example, hydrolyze even in neutral solutions, although more slowly than in acidic or basic media, to produce the corresponding silanols. Except for the monosilanols, these in turn may polymerize to siloxanes which, on calcination, convert to uncombined silicon dioxide.

The amount of ester employed in the reaction can vary depending upon the amount of inorganic oxide desired in the finished inorganic oxide-alumina composition. In turn the amount of inorganic oxide desired in the final catalyst may depend upon the particular modifying oxide and upon the particular use to which the catalyst is to be put. These amounts are well described in the art and usually embrace a major proportion of alumina and a minor proportion of modifying oxide, or vice versa. Thus, for example, in petroleum cracking catalysts comprising $SiO_2$ and alumina a presence of at least about 5 weight percent of $SiO_2$, advantageously from about 15 to 35%, may be desired. Conversely, in other catalysts the silica may be the predominant component, with the alumina being, for instance, in the approximate 15 to 35% range. In any event the amount of each of the reactants is sufficient to exert a significant catalytic effect in the final product, and usually will be sufficient to provide a minimum of about 1 wt. percent of each in the final product.

Generally, the extent of reaction of the ester with the

groups of the alumina base varies directly with reaction temperature, reaction time and the percent of vaporizable material in the alumina base. Infra-red studies of the reaction products also reveal that calcination thereof provides additional bonding between the ester and the alumina, the increase in bonding being proportional to the severity of the calcination temperature. Thus, with ethyl orthosilicate-alumina reaction products, for instance, the indicative infra-red absorption band was shifted from 1072 cm.$^{-1}$ for products calcined at 500° F. to 1030 cm.$^{-1}$ for those calcined at 1050° F. The extent to which the band decreases from 1100 cm.$^{-1}$ is an indication of the extent of interreaction between silic acid esters and alumina.

As previously mentioned, the process of the invention provides advantages in the dispersion of catalytic promoters on the silica-alumina, boria-alumina, titania-alumina or phosphorus oxide-alumina support. For example, many catalytic metal promoters such as platinum are more highly dispersed on alumina than on silica-alumina. Thus, in accordance with the present invention, advantage can be taken of alumina's greater dispersing ability by depositing the catalytic promoter on the alumina and then depositing the silica in accordance with the process of the present invention, i.e., reaction with the silicate, followed by calcining. When a catalytic promoter is provided in this manner it is preferred to calcine the composition prior to washing in order to avoid or reduce promoter loss via washing. Then after the silica, boria, titania or phosphorus oxide is chemically combined with the alumina the catalyst composition is again dried and calcined. Any of various promoters can be employed, such as, for instance, the hydrogenation-denitrogenation catalytic metals of Groups IV, V, VI and VIII of the Periodic Table such as chromium, tungsten, vanadium, iron, cobalt, molybdenum, nickel, and the platinum series metals. The promoting metals can be deposited on the substrate by various methods such as precipitation, coprecipitation, impregnation or mulling.

The following examples are included to further illustrate the present invention.

EXAMPLE I

The alumina used as a starting material had a surface area of 446 m.$^2$/g. of $Al_2O_3$, a 33.7% weight loss on ignition, i.e., weight percent of vaporizable material at 1000 C., and was identified by X-ray diffraction to consist of a mixture of amorphous hydrous alumina and boehmite of 30 to 40 A. crystallite size.

75 g. of this alumina and 300 ml. of isooctane were placed in a flask provided with a stirrer, reflux condenser and heating mantle. 51.6 ml. of ethyl orthosilicate were added to this mixture, an amount equivalent to 0.28 g. $SiO_2$ per g. $Al_2O_3$. The reaction mixture was refluxed with stirring for 3.75 hours. After cooling, the reflux condenser was replaced by an overhead condenser and 146.5 g. of distillate were collected; this distillate consisted of two phases, i.e., 22 g. of a dense phase and 119.5 g. of a lighter phase. 200 ml. of isooctane were added to the reaction slurry, which was allowed to stand overnight at room temperature before distilling another 81 g. of distillate which contained about 1 ml. of a dense phase. Each distillate was analyzed and found to contain ethanol, although much less in the second distillate; the total ethanol recovered in this way amounted to 3.6 moles per mole of $SiO_2$ deposited on the alumina. The silicated alumina was filtered, washed with 100 ml. of isooctane, dried in an oven at 110° C. and finally calcined for 3 hours at 900° F. in a muffle furnace. The product, designated 126, contained 17.6% $SiO_2$ (ignited weight basis) and had a surface area of 325 m.$^2$/g.

EXAMPLE II 75 g. of the alumina of Example I, 220 ml. of isooctane and 50 ml. of ethyl triethoxysilane were refluxed overnight as in Example I; the amount of ethyl triethoxysilane was equivalent to 0.28 g. $SiO_2$ per g. of $Al_2O_3$. After standing at room temperature for two days, 110.5 g. of a two-phase distillate was obtained, with a total ethanol content equivalent to 0.5 mole per mole of $SiO_2$ reacted. The solid was filtered, washed with isooctane, dried at 110° C. and calcined for 6 hours at 900° F. The product, designated 31, analyzed 12.0% $SiO_2$ and had a surface area of 430 m.$^2$/g.

EXAMPLE III

A silicated alumina was prepared essentially as described in Example II, but with an equivalent quantity of dimethyldiethoxysilane. The product, designated 114, analyzed 7.7% $SiO_2$. The infrared spectrums of the calcined products of each of the foregoing examples showed a band in the 1200–1050 cm.$^{-1}$ region which can be distinguished from the 1100 cm.$^{-1}$ band characteristic of pure silica or of conventional silica-alumina.

Among the alkoxysilanes, the reaction with hydroxyl-containing alumina occurs more readily as the number of alkoxy groups increases. For example, it is clear from Examples I–III that tetraethoxysilane (ethyl orthosilicate) is more reactive than the triethoxy compound, which, in turn, is more reactive than the diethoxy compound. For this reason, and because of its lower cost, ethyl orthosilicate is the preferred ester for preparing silicated alumina by the method of the present invention.

EXAMPLE IV 75 grams of the alumina of Example I, suspended in isooctane, in a reaction flask equipped with reflux condenser and Stark tube, where heated under reflux until water ceased to collect in the Stark tube, thereby reducing the loss on ignition of the alumina to 22%, as calculated from the 11.5 ml. of water so collected. After this dehydration step, 51.6 ml. of ethyl orthosilicate were added, equivalent to 0.28 g. $SiO_2$ per g. $Al_2O_3$, and the mixture refluxed for 21 hours. After cooling to room temperature, the mixture was partially distilled to collect 61.3 g. of distillate, containing ethanol equivalent to 1.7 moles per mole of $SiO_2$ reacted. The solids were filtered, washed with 100 ml. of isooctane, dried at 110° C. and calcined for 6 hours at 900° F. The product, designated 57, analyzed 11.6% $SiO_2$ and had a surface area of 362 m.$^2$/g.

EXAMPLE V

The alumina of Example I was calcined in a muffle furnace at 900° F. to reduce its loss on ignition to 1.9%. This was allowed to react with ethyl orthosilicate as in Example IV, without the dehydration step. The product, designated 184, analyzed 4.0% $SiO_2$. It is clear from Examples I, IV and V that a reduction in the loss on ignition of alumina results in a lower reactivity thereof with ethyl orthosilicate.

EXAMPLE VI 25 grams of the alumina of Example I, 24.6 ml. of ethyl orthosilicate, and 100 ml. of isooctane were charged to a stirred autoclave. Air was removed by purging with nitrogen. The autoclave was heated to 212° C., and maintained at this temperature for 15.5 hours. After cooling to room temperature the mixture was removed and filtered. The treated alumina was solvent washed, air dried overnight, oven dried at 110° C., and calcined for 3 hours at 900° F., in a muffle furnace. The product, designated 389, analyzed 26.7% $SiO_2$.

EXAMPLE VII 25 grams of the alumina of Example I, calcined for 3 hours at 900° F. in a muffle furnace, 150 ml. of isopropanol, and 3.32 ml. of trimethylborate were placed in a flask provided with a stirrer, reflux condenser with drying tube and a heating mantle. The mixture was refluxed for approximately 8 hours and allowed to stand about 8 hours at room temperature. The treated alumina was washed with isopropanol, oven dried at 110° C., and calcined 3 hours at 900° F., in a muffle furnace. The product, designated 306, contained 2.8% $B_2O_3$.

75 grams of the alumina of Example I were suspended in isooctane and dehydrated to 22.1% V.M. by the technique described in Example IV. To the stirred mixture was added 72.9 g. of triethylphosphate. The reaction mixture was stirred at room temperature for 3 hours and then was heated to reflux temperature and refluxed 17 hours. The mixture was allowed to stand at room temperature for 3 days before the liquid was distilled off. The treated alumina was solvent washed, oven dried, and calcined 3 hours in a muffle furnace. The calcined product, designated 75, analyzed 6.4% $PO_4$.

Table I summarizes the results of varying the reactants and reaction conditions. The products of Examples I–VIII, as well as those of similar reactions, are described therein. Titanated alumina products, resulting from the reaction of tetraisopropyl titanate with hydroxyl containing alumina, are represented as well, e.g., Sample Nos. 105, 135 and 121.

TABLE I

| | Alumina Base | | | Reactant | | Conditions | | Product | | |
|---|---|---|---|---|---|---|---|---|---|---|
| Sample No. | Area, m.$_2$/g.[1] | Pretreatment | Vaporizable material after pretreatment, wt. percent | Ester | Gms. oxide (equivalent) per gm. alumina | Reaction Temperature [2] | Alcohol recovered [3] (mols/mol reacted of dioxide) | Oxide content, wt. percent [4] | Area, m.$^2$/g. | Example No. |
| 126 | 446 | None | 33.7 | (EtO)$_4$Si | 0.28 (SiO$_2$) | Reflux | [5]3.6 | 17.6 (SiO$_2$) | 325 | I |
| 31 | 446 | do | 33.7 | EtSi(OEt)$_3$ | 0.28 (SiO$_2$) | do | 0.5 | 12.0 (SiO$_2$) | 430 | II |
| 114 | 446 | do | 33.7 | Me$_2$Si(OEt)$_2$ | 0.28 (SiO$_2$) | do | | 7.7 (SiO$_2$) | | III |
| 57 | 446 | Dehydration | 22.0 | (EtO)$_4$Si | 0.28 (SiO$_2$) | do | 1.7 | 11.6 (SiO$_2$) | 362 | IV |
| 184 | 446 | Calcination, 900° F | 1.9 | (EtO)$_4$Si | 0.28 (SiO$_2$) | do | | 4.0 (SiO$_2$) | | V |
| 389 | 446 | None | 33.7 | (EtO)$_4$Si | 0.28 (SiO$_2$) | 212° C.[6] | | 26.7 (SiO$_2$) | | VI |
| 306 | 446 | Calcination, 900° F | | (MeO)$_3$B | | Reflux [7] | | 2.8 (B$_2$O$_3$) | | VII |
| 75 | 446 | Dehydration | 22.1 | (EtO)$_3$PO | | do | | 6.4 (PO$_4$)$^{-1}$ | | VIII |
| 105 | 446 | do | 22.0 | (i-PrO)$_4$Ti | 0.25 (TiO$_2$) | do | | 11.2 (TiO$_2$) | 369 | |
| 135 | 446 | None | 33.7 | (i-PrO)$_4$Ti | 0.25 (TiO$_2$) | do | | 20.8 (TiO$_2$) | 308 | |
| 121 | 446 | Water added | 49.4 | (i-PrO)$_4$Ti | 0.25 (TiO$_2$) | do | | 21.0 (TiO$_2$) | 278 | |
| 9054 | 446 | None | 33.7 | (EtO)$_4$Si | 0.12 (SiO$_2$) | do | 3.3 | 10.5 (SiO$_2$) | 340 | |
| 151 | 446 | do | 33.7 | (EtO)$_4$Si | 0.28 (SiO$_2$) | do [8] | | 14.8 (SiO$_2$) | 240 | |
| 9059 | 446 | do | 33.7 | (EtO)$_4$Si | 0.39 (SiO$_2$) | do | | 18.2 (SiO$_2$) | 319 | |
| 9070 | 446 | Water added | 48.6 | (EtO)$_4$Si | 0.39 (SiO$_2$) | do | | 18.7 (SiO$_2$) | 298 | |
| 9071 | 446 | None | 33.7 | (EtO)$_4$Si | 1.00 (SiO$_2$) | do | | 21.0 (SiO$_2$) | 306 | |
| 381 | 446 | Calcination, 500° F | 14.0 | (EtO)$_4$Si | 0.28 (SiO$_2$) | do | | 5.2 (SiO$_2$) | | |
| 393 | 446 | Dehydration | 23.0 | (EtO)$_4$Si | 0.28 (SiO$_2$) | do | | 8.8 (SiO$_2$) | | |
| 382 | 446 | do [9] | | (EtO)$_4$Si | 0.28 (SiO$_2$) | do | | 11.0 (SiO$_2$) | | |
| 349 | 446 | do | 22.4 | (EtO)$_4$Si | 0.28 (SiO$_2$) | do | | 14.2 (SiO$_2$) | | |
| 368 | 446 | None | 33.7 | (EtO)$_4$Si | 0.40 (SiO$_2$) | 110° C.[10] | | 18.2 (SiO$_2$) | | |

[1] Before pretreatment.
[2] With overnight stirring in isooctane solvent, followed by distillation of most of solvent and alcohol product.
[3] Alcohol recovered in the distillate.
[4] Ignited weight basis.
[5] After distillation of solvent, more solvent added for a second distillation.
[6] Reacted 15.5 hours in stirred autoclave.
[7] Isopropanol solvent.
[8] Methyl ethyl ketone solvent.
[9] Dehydrated in methanol, reacted in isooctane.
[10] Reacted 2 hours in stirred autoclave.

The products of Examples I and II, and of other silica-aluminas prepared by the method of this invention were used as catalysts to test-crack a petroleum hydrocarbon East Texas gas oil fraction having the following approximate characteristics:

| | |
|---|---|
| IBP (° F.) | 490–510 |
| 10% | 530–550 |
| 50% | 580–600 |
| 90% | 650–670 |
| EP | 690–710 |
| Grav. (API, deg.) | 33–35 |
| Visc. (SUS at 100° F.) | 40–45 |
| Aniline point, ° F | 170–175 |
| Pour point, ° F | 35–40 |
| Sulfur, percent | 0.3 |

The results of the test cracking are given in Table II, wherein RA stands for relative activity, GF for gas factor, CF for coke factor and GG for gas gravity.

TABLE II.—GAS-OIL CRACKING TEST DATA—SILICATED ALUMINA [1]

| Sample No. | 9054 | [2]9056 | 31 | 151 | 126 | 9059 | 9070 | 9071 |
|---|---|---|---|---|---|---|---|---|
| Percent SiO$_2$ | 10.5 | 11.7 | 12.0 | 14.8 | 17.6 | 18.2 | 18.7 | 21.0 |
| Virgin: | | | | | | | | |
| R.A. | 52.5 | 85.5 | 90.0 | 113.0 | 121.0 | 97.5 | 83.0 | 96.6 |
| G.F. | 1.20 | 1.05 | 1.03 | 1.00 | 0.98 | 1.05 | 0.95 | 0.86 |
| C.F. | 1.11 | 0.91 | 1.06 | 0.92 | 1.17 | 1.06 | 0.92 | 1.02 |
| G.G. | 1.06 | 1.16 | 1.17 | 1.23 | 1.22 | 1.18 | 1.31 | 1.41 |
| Steamed (hrs.) 1,150° F. | 24 | 24 | 6 | 6 | 6 | 24 | 24 | 24 |
| R.A. | 45.5 | 75.7 | 70.5 | 77.5 | 76.3 | 73.3 | 78.0 | 75.5 |
| G.F. | 1.17 | 0.93 | 1.00 | 0.93 | 0.99 | 0.95 | 0.90 | 0.85 |
| C.F. | 0.94 | 0.95 | 0.94 | 0.84 | 0.97 | 0.79 | 0.96 | 1.05 |
| G.E. | 1.11 | 1.23 | 1.12 | 1.30 | 1.22 | 1.26 | 1.29 | 1.31 |
| Surface Areas (m.$^2$/g.): | | | | | | | | |
| Virgin | 340 | 360 | 430 | | 325 | 319 | 298 | 306 |
| Steamed | 256 | 260 | 310 | 248 | 238 | 232 | | |

[1] For details of preparation see Table I.
[2] Prepared by impregnation with pure EtSi (OEt)$_3$, drying, and calcining.

As illustrated in the foregoing Table II, the silicated aluminas of the present invention are good cracking catalysts and provide moderately good product distributions. Although effective as cracking catalysts at SiO$_2$ concentrations as low as 5%, it is apparent that higher activities are obtained with SiO$_2$ levels of about 15% or more.

The steam treatment of the catalysts at 1150° F. was conducted for about 6 hours. Even after this degradative treatment most of the samples had a relative activity of 75 or better, indicating good stability thereof. It is noted that the highest activity was obtained with Sample No. 126, which received the extra distillation during preparation.

A micro-reactor technique was used for comparing catalysts on the basis of their ability to crack heptene-2. In this technique slugs of vaporized heptene-2 were injected into a helium carrier gas stream, over the catalyst, and into a gas chromatograph for analysis. This reaction was chosen as being representative of the cracking reactions occuring in hydrocracking, and heptene cracking conversions are found to correlate with hydrocracking activities of the same supports promoted with platinum. Thus, heptene-2 cracking can serve as a screening test for hydrocracking supports. Table III shows results obtained at 400° C. using 300 mg. of catalyst and He carrier gas at a flow rate of 167 ml./min. Isomerization to branched C$_7$ olefins is ignored in calculating conversion, and the weight percentage of the heptene-2 converted to C$_3$ and C$_4$ hydrocarbons was taken as cracking conversion.

TABLE III.—CRACKING OF HEPTENE-2 IN A PULSE INJECTION TYPE MICRO REACTOR

| Sample No. | Percent SiO$_2$ | Cracking Conversion |
|---|---|---|
| Control* | 0 | >0 |
| 381 | 5.1 | 0.3 |
| 393 | 8.8 | 3.4 |
| 9054 | 10.5 | 6.8 |
| 382 | 11.0 | 12.9 |
| 349 | 14.2 | 26.1 |
| 368 | 18.2 | 37.6 |
| 9070 | 18.7 | 44.5 |

*The unmodified alumina base of the examples.

We claim:
1. A process for the production of an acidic, inorganic oxide-alumina composition which consists essentially of heating and reacting in an inert liquid organic solvent at a temperature of about 80 to 250° C., an uncalcined hydroxyl-containing alumina having about 15 to 40 percent vaporizable material, and having a surface area of at least about 300 m.$^2$/gm. with an ester selected from the group consisting of:

$$R_{(4-x)}Si(OR')_x$$

$$Ti(OR)_4$$

and $$(RO)_3PO$$

wherein R and R' are hydrocarbon groups of up to 18 carbon atoms and $x$ is an integer from 1 to 4, and separating resulting inorganic oxide-alumina composition from the solvent and alcohol produced by said reaction.

2. The process of claim 1 wherein the resulting inorganic oxide-alumina composition is calcined to an active catalytic state.

3. The process of claim 1 wherein R and R' are alkyl groups of 1–8 carbon atoms.

4. The process of claim 1 wherein the ester is ethyl orthosilicate.

5. The process of claim 1 wherein the ester is tetraisopropyl titanate.

6. The process of claim 1 wherein the ester is triethyl phosphate.

7. The process of claim 1 wherein the inert organic solvent is hydrocarbon.

8. The process of claim 7 wherein the separated inorganic oxide-alumina composition is calcined to a more catalytically-active state.

9. The process of claim 7 wherein the reaction is conducted under reflux.

10. The process of claim 9 wherein the separated inorganic oxide-alumina composition is calcined to a more catalytically-active state.

11. The process of claim 10 wherein the solvent is isooctane.

References Cited

UNITED STATES PATENTS

| | | | |
|---|---|---|---|
| 2,154,079 | 4/1939 | Weiss | 252—455 |
| 2,243,404 | 5/1941 | Voorhies | 252—455 |
| 2,394,796 | 2/1946 | Marisic | 252—455 |
| 2,422,884 | 6/1947 | Burgin | 252—432 |
| 2,428,741 | 10/1947 | Plank | 252—455 |
| 2,493,896 | 1/1950 | Pardee et al. | 252—455 |
| 2,912,421 | 11/1959 | Juveland et al. | 252—430 |
| 2,943,066 | 6/1960 | Arnold et al. | 252—463 |
| 3,014,020 | 12/1961 | Balthis | 252—463 |

PATRICK P. GARVIN, Primary Examiner

U.S. Cl. X.R.

252—432, 455, 463